US011245640B1

(12) United States Patent
Maurya et al.

(10) Patent No.: US 11,245,640 B1
(45) Date of Patent: Feb. 8, 2022

(54) SYSTEMS, METHODS, AND APPARATUSES FOR PREDICTING AVAILABILITY OF A RESOURCE

(71) Applicant: Amazon Technologies, Inc., Seattle, WA (US)

(72) Inventors: Abhinav Maurya, Seattle, WA (US); Pawel Cholewinski, Kirkland, WA (US); Kerem Bulbul, Seattle, WA (US); John David Dunagan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/997,615

(22) Filed: Aug. 19, 2020

(51) Int. Cl.
| | | |
|---|---|---|
| *H04L 12/911* | (2013.01) | |
| *G06F 9/455* | (2018.01) | |
| *G06F 17/18* | (2006.01) | |
| *G06N 3/04* | (2006.01) | |
| *G06N 20/20* | (2019.01) | |

(Continued)

(52) U.S. Cl.
CPC ........ *H04L 47/781* (2013.01); *G06F 9/45558* (2013.01); *G06F 17/18* (2013.01); *G06K 9/6257* (2013.01); *G06N 3/0454* (2013.01); *G06N 5/025* (2013.01); *G06N 20/20* (2019.01); *H04L 47/826* (2013.01); *H04L 47/827* (2013.01); *G06F 2009/45583* (2013.01); *G06F 2009/45595* (2013.01)

(58) Field of Classification Search
CPC ... H04L 47/781; H04L 47/826; H04L 47/827; G06N 20/20; G06N 3/0454; G06N 5/025; G06F 9/45558; G06F 17/18; G06K 9/6257
See application file for complete search history.

(56) References Cited

U.S. PATENT DOCUMENTS

2017/0034042 A1* 2/2017 Gross ................ H02J 13/00007
2018/0314250 A1* 11/2018 Lewis .................. G06N 3/0454
(Continued)

OTHER PUBLICATIONS

Lundberg, Scott M and Su-In Lee, "A Unified Approach to Interpreting Model Predictions", 31st Conference on Neural Information Processing Systems (NIPS 2017), arXiv:1705.07874v2, 10 pages.
(Continued)

*Primary Examiner* — Philip J Chea
*Assistant Examiner* — Mohammed Ahmed
(74) *Attorney, Agent, or Firm* — Nicholson De Vos Webster & Elliott, LLP

(57) ABSTRACT

Techniques for predicting the availability of a resource are described. An exemplary method includes obtaining capacity data indicating an amount of capacity available in a cloud provider network to satisfy the request; generating, using a machine learning model that has been trained based at least in part on an output of an automated historical hindsight learner that is an integer linear program, an approval prediction, wherein the approval prediction indicates that the request is to be approved based on one or more launch parameters of the request and the capacity data; receiving information from a downstream component that controls the resource that the approval prediction is incorrect; and evaluating the incorrect approval prediction using a hindsight learner and predictor explainer.

16 Claims, 8 Drawing Sheets

(51) Int. Cl.
G06N 5/02 (2006.01)
G06K 9/62 (2006.01)

(56) References Cited

U.S. PATENT DOCUMENTS

| | | | | |
|---|---|---|---|---|
| 2020/0242400 | A1* | 7/2020 | Perkins | G06K 9/6256 |
| 2020/0259852 | A1* | 8/2020 | Wolff | H04L 63/1441 |
| 2020/0410288 | A1* | 12/2020 | Capota | G06F 9/5072 |
| 2020/0412810 | A1* | 12/2020 | Knight | H04L 67/10 |
| 2021/0133439 | A1* | 5/2021 | Mehra | G06K 9/6267 |
| 2021/0224696 | A1* | 7/2021 | Nasr-Azadani | G06F 21/64 |
| 2021/0281491 | A1* | 9/2021 | Yelahanka Raghuprasad | H04L 47/2441 |

OTHER PUBLICATIONS

Ribeiro, Marco Tulio et al., "Why Should I Trust You?: Explaining the Predictions of Any Classifier", ACM, 2016, arXiv:1602.04938v3, 10 pages.

Sutton, Richard S. and Andrew G. Barto, Reinforcement Learning: An Introduction, second edition, 2018.

* cited by examiner

SYSTEMS, METHODS, AND APPARATUSES FOR PREDICTING AVAILABILITY OF A RESOURCE

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
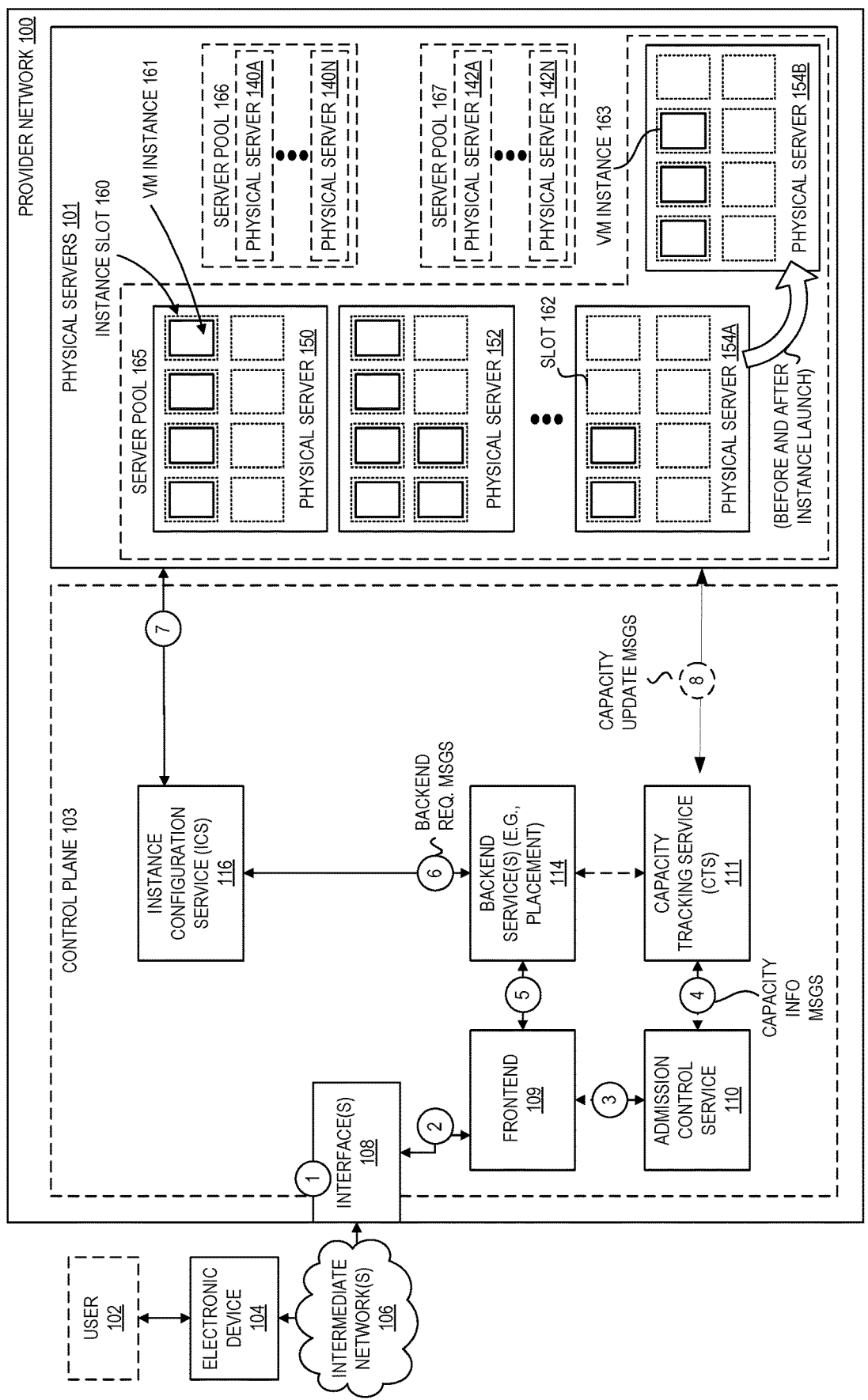
FIG. 1 is a diagram illustrating an environment that enables better admission control for requests to launch computing resources of a service provider network.

Cloud provider networks allow customers to access and use many types of resources (e.g., computing resources such as virtual machine (VM) instances and containers, storage, network). Although a cloud provider may desire to satisfy as many customer requests as possible by giving them the resource they requested, the cloud provider network can receive more requests for a particular type of resource than it is possible to satisfy without hitting a depletion threshold for an available (e.g., currently unused) pool of that resource. The present disclosure relates to methods, apparatus, systems, and non-transitory computer-readable storage media for enabling a cloud provider network to protect both its resource pools and the experience of its customers by using a machine learning mechanism to predict the optimal access control actions (e.g., granting or denying a request for a particular resource) that balance pool protection with the goal of satisfying as many customer requests as possible. In particular, access control action predictions are performed using a machine learning model that has been trained based on historical and/or simulated data for approving or denying a launch of usage of a resource for a particular request.

In some embodiments, responsive to a user request to launch one or more computing resources, an admission control service of the cloud provider network generates an access control action prediction indicating that there is likely insufficient capacity at the cloud provider network to satisfy the parameters of the user's request (e.g., parameters related to a type of capacity, amount of capacity, a region in which to launch the capacity, etc.). In existing cloud provider network access control systems, such decisions are typically performed by various system components (e.g., capacity tracking services, placement services, etc.) that analyze information indicating availability capacity and send out an insufficient capacity exception ("ICE") message when sufficient capacity likely is unavailable to satisfy a request. To verify these decisions, a human needs to annotate the decisions for review. Further, existing systems typically implement rule-based approaches to tackle the problem of reducing the overall number of ICEs, however the right set of effective rules can change, rule parameters can stagnate, and may need to be tuned on expensive simulations.

The disclosed techniques address the aforementioned challenges, among others, in some embodiments by generating a prediction in an admission control service that may be used to relieve backend systems from making such determinations and allow requests to be "ICE'd" earlier in the resource launch request handling process without requiring human intervention in the "ICE" decision. Beneficially, the disclosed mechanism enables the admission control service to learn the set of access control actions to take to protect resource pools while minimizing one or both of (a) the overall number of customers who receive ICE decisions, and (b) the number of customers who receive multiple ICE decisions within a designated interval of time.

In particular, embodiments detailed herein relate to using machine learning to predict when a request to launch a resource should be approved or denied. For example, an admission control service includes at least one machine learning model to predict whether or not a request for a resource should be approved and sent to a backend component controlling the resource or denied. The at least one machine learning model has been trained using input from "optimal" historical decisions. Current state of the art for approval or denial uses rules-based services which may be difficult to maintain.

Service providers of virtualization technologies and other services often maintain fleets of computer systems and other equipment that form the infrastructure (for example, physical computer systems, networking systems, storage systems) on which to host virtualized computing resources and other services. In many cases, users can make use of such virtualization technologies with little awareness of the underlying physical hardware supporting their virtualized computing resources and their availability. Furthermore, users may often have little to no awareness of, or visibility into, the factors that influence a request acceptance or denial (e.g., acceptance or denial of a placement of their virtualized computing resources on particular physical hardware).

When launching or accessing virtualized computing resources onto non-dedicated computer systems (that is, computer systems which may be shared among multiple users of a service provider), the service provider may provide users some control over how such resources are placed into the server provider-managed infrastructure. A user might configure a placement group, for example, to use one or more of the following placement strategies when launching new compute instances: cluster instances into one or more low-latency groups (for example, onto one or more physical servers with high-speed interconnectivity); partition or spread instances across logical partitions, ensuring that instances in one partition do not share underlying hardware with instances in other partitions; or spread instances across underlying hardware. In addition to these optional, user-configurable placement settings, a service provider typically applies various internal placement rules and processes to manage overall fleet health, improve capacity availability, and spread load within the multi-tenant provider network. These placement decisions made by the service provider can often have a significant effect on resource utilization, power consumption, licensing costs, and other aspects of managing the data centers that support the service provider's infrastructure.

In some instances, there may be insufficient resources (e.g., insufficient capacity for a particular type and amount of requested resources in a server pool, region, etc.) to handle a request for a particular type and amount of requested resources, meaning the provider network 100 cannot adequately allocate enough resources to handle the request. This decision is made by a backend service 114 (e.g., a placement service, etc.).

Typically, priority of a request should go to those entities that have consistent and predictable usage patterns.

FIG. 1 is a diagram illustrating an environment that enables better admission control for requests to launch computing resources of a service provider network. A user 102 operates an electronic device 104 or configures the electronic device 104 for communications with the provider network 100. The electronic device 104 communicates with the provider network 100 via one or more intermediate networks 106, such as the internet. As described above, a provider network provides users with the ability to use one or more of a variety of types of computing-related resources such as compute resources (for example, executing virtual machines (VMs) and/or containers, executing batch jobs, executing code without provisioning servers), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, and so forth. These and other computing resources may be provided as services, such as a hardware virtualization service that can execute compute instances, a storage service that can store data objects, and so forth. The users (or "customers") of multi-tenant provider networks 100 may utilize one or more user accounts that are associated with a customer account, though these terms may be used somewhat interchangeably depending upon the context of use. In this description, the admission control service 110 is handling requests for placement as the example of the request for a resource. Note the admission control service 110 can handle a variety of requests, including, but not limited to: requests for volumes hosted by an elastic block store service (referred to in various implementations as a cloud disks service, a managed disk service, a storage area network service, a persistent disk service, or a block volumes service); requests for VMs/instances hosted by an elastic compute cloud service (referred to in various implementations as an elastic compute service, a virtual machines service, a computing cloud service, a compute engine, or a cloud compute service); requests for containers hosted by a container orchestration and management service (referred to in various implementations as a container service, cloud container service, container engine, or container cloud service); etc.

To provide these and other computing resource services, provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

A user can use an interface of the provider network 100 attempt to create, use, and/or configure aspects of virtualized computing resources that execute on at least one fleet 101 of physical servers. The physical servers in the fleet 101 of physical servers can be computer systems of various configurations that differ along one or more dimensions, such as number and type of processors, type and amount of memory, connectivity of the memory to the processor(s), number and type of network interfaces, number and type of local storage devices (e.g., solid-state drives), number and type of hardware accelerators (e.g., graphics processing units), etc. In large-scale networks, there may be hundreds, thousands, or more physical servers, which may be located in multiple geographic locations.

The fleet 101 includes, but is not limited to, a server pool 165 including physical servers 150, 152, and 154 (shown before and after a launch as 154A and 154B). Prior to any operations associated with the described compute instance launch, the state of the physical servers 150, 152, and 154A is as follows: physical server 150 is hosting several VM instances, including VM instance 161 in a VM instance slot 160. Similarly, physical servers 152 and 154 are shown currently hosting other VM instances in VM instance slots, where each server has some number of unused instance slots representing an amount of unused compute capacity of the server. Note that the fleet 101 may include physical servers with different amounts of capacity, and support for different types and sizes of virtualization computing resources. Further note that VM slots (for example, the VM instance slot 160) illustrated within the electronic devices 150, 152, and 154A may be logical representations of portions of capacity managed by a control plane 103 of the provider network 100. The electronic devices 150, 152, and 154A may or may not have a local concept of a slot and execute instances based on received configuration and launch instructions, as described below.

At the circle labeled "1," a user sends one or more messages to request launch an instance request on one or more physical servers, or with one or more pools of physical servers within a fleet of physical servers. Communications between the electronic device 104 and the provider network 100, such as the request specifying the request (e.g., placement), can be routed through interface(s) 108, such as through use of application programming interface (API) calls, via a console implemented as a website or application, and so forth. The interface(s) 108 may be part of, or serve as a frontend to, a control plane 103 of the provider network 100 that includes "backend" services supporting and enabling the services that may be more directly offered to customers, such as services that enable the ability of users to configure placement preferences and to launch instances within the fleet 101.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

In some embodiments, a request includes information such as one or more of an account identifier of the requester, a slot type to use in a physical server (e.g., the type of compute resource such as a type of processor (CPU, GPU, etc.), an indication of a number of slots requested, a timestamp for the request, and/or a region that the server(s) should be in. For example, and as described in more detail hereinafter, a user might prefer that VM instances requiring a particular type of server-bound software license be clustered together on as few physical servers as possible within the user's fleet (for example, to minimize license costs), prefer that particular types of VM instances are clustered together for low-latency and other performance reasons, or prefer that other types of VM instances are spread across physical servers for redundancy purposes, or prefer other types of preferences or combinations thereof.

For example, a defined placement preference for clustering instances associated with a software license can be associated with a relatively high weighting for resource launches associated with a tag or other indication that the associated resource requires the particular software license. Thus, when evaluating candidate VM slots on physical servers, slots on servers already associated with the software license, and already executing other instances that require the same license, can be highly ranked compared to slots on servers that would require an additional license to be obtained. On the other hand, the placement process for launching a resource that does not require the software license may not apply the software license-related placement preference, or apply a low weight to the preference, while preferring one or more other preferences (for example, preferences associated with clustering resources for performance reasons or spreading the resources for redundancy purposes). As these examples illustrate, the placement decision generally can be based on any combination of (i) placement preferences specified by a user (and optional weights/prioritizations associated with each placement preference), (ii) properties associated with a launch request, and (iii) properties and state information associated with physical servers of a fleet of physical servers into which a resource is being launched.

At circle 2, a frontend 109 takes the request message(s) and forwards them to an admission control service 110 at circle 3. The admission control service 110 evaluates the request to determine whether the request should be ICE'd (denied) or allowed. In particular, the admission control service 110 uses one or more machine learning algorithms to mimic optimal hindsight decisions discovered by an optimization routine to predict whether or not a request should be denied. In some embodiments, simulators generate data and feed it to the optimization routine which then outputs the best admission control actions in hindsight (that is, having information about whether or not a request was properly approved/denied based on downstream acts). The machine learning algorithm(s) use(s) contextual information available about an admission control request and the optimization routine's optimal decisions to learn how to predict the optimal decisions based on the contextual information associated with the admission control request.

To make this prediction, the admission control service 110 fetches capacity information from a capacity tracker service (CTS) 111, as indicated at circle "4" to gather information about the physical servers 101. This information includes information such as one or more of: capacity for a slot type to use in a physical server, an indication of a number of slots free, a timestamp for the information, and/or a region information for the server(s) (e.g., what region(s) have what capacity). Additional side information such as predicted demand, effective free capacity in pools that can donate to the pool serving the launch request, etc. may also be provided by the CTS 111 and can be useful inputs in deciding to deny a request.

The admission control service 110 evaluates the launch request against the capacity information and, in some cases, may reject a request based on usage of one or more ML models. In cases where the admission control service 110 rejects a request for capacity, the frontend 109 and/or interface(s) 108 to provide an indication of the reason for failure to the customer. Otherwise, the admission control service 110 allows the request.

In some embodiments, in addition to the machine learning-based prediction, the admission control service 110 utilizes one or more policies to help determine if a request should proceed. Exemplary policies include checking the requesting user's creditworthiness, whether the user has any limits imposed on the number of instances they can launch, and whether the request might lead to resource shortages within the fleet 101.

Assuming the admission control service 110 allows the request, at circle "5," the frontend 109 sends one or more messages to one or more backend services 114 (such as a placement service) to continue processing the request.

The backend service(s) 114 determines if it can satisfy the request based on data available to it. For example, using state indicating available instance slots on each physical server, which instances are on which physical servers, the configurations of those instances, etc. The fleet 101 may include numerous physical servers, each with varying properties and amounts of available capacity. In some embodiments, the backend service(s) 114 also send updated capacity usage information to the CTS 111, so that the CTS 111 can update its capacity information. The backend service(s) 114 also alert the admission control service 110 of any decisions that are contrary to the recommendation (e.g., a request was allowed by the admission control service 110, but denied by the backend service(s) 114.

The backend service(s) 114 utilize an instance configuration service (ICS) 116 to launch an instance by sending messages to the ICS 116 to configure and launch the instance, as indicated at circle "6."

The ICS 116 receives the instruction to configure and launch an instance and causes the launch at circle "7.". In some embodiments, the ICS 116 performs a workflow to configure and launch an instance according to one or more parameters, such as the compute, memory, network, storage, or other configuration settings. The ICS 116 communicates with the physical server of the fleet 101 designated to host the instance, sending one or more messages to configure and launch the instance. For example, in some embodiments the ICS 116 may cause an offload card (which may include one or more processors, a local memory, physical network interfaces, and so forth) that is a part of (that is, coupled with) an electronic device of the fleet 101 to launch the compute instances. The offload card may implement a virtualization manager that can manage, for example, virtual machine compute instances that execute on a host electronic device, independent of a hypervisor or in combination with a hypervisor that executes using the traditional CPU(s) of the electronic device. For example, in some embodiments, the virtualization manager implemented by the offload card can instantiate and/or terminate virtual machines, thus eliminating the need for the hypervisor to perform these tasks, which can improve the performance of the virtual machines themselves due to not having to compete for resources with the hypervisor.

Alternatively, in some embodiments, the ICS 116 interacts with a hypervisor (for example, via a VM management server) to cause the compute instance(s) to be launched. In either case, the ICS 116 causes the physical server to create a virtual machine or other environment with the requested hardware configuration (for example, with access to a local solid-state drive, with two network interfaces, access to a local graphics accelerator, four cores, and 8 gigabytes of memory) and software configuration (executing a machine image that includes a Linux or other operating system, and so forth). Continuing the launch example in FIG. 1, the ICS 116 causes a VM instance 163 to be launched on physical server 154B (showing physical server 154A after launch).

Figure 2:
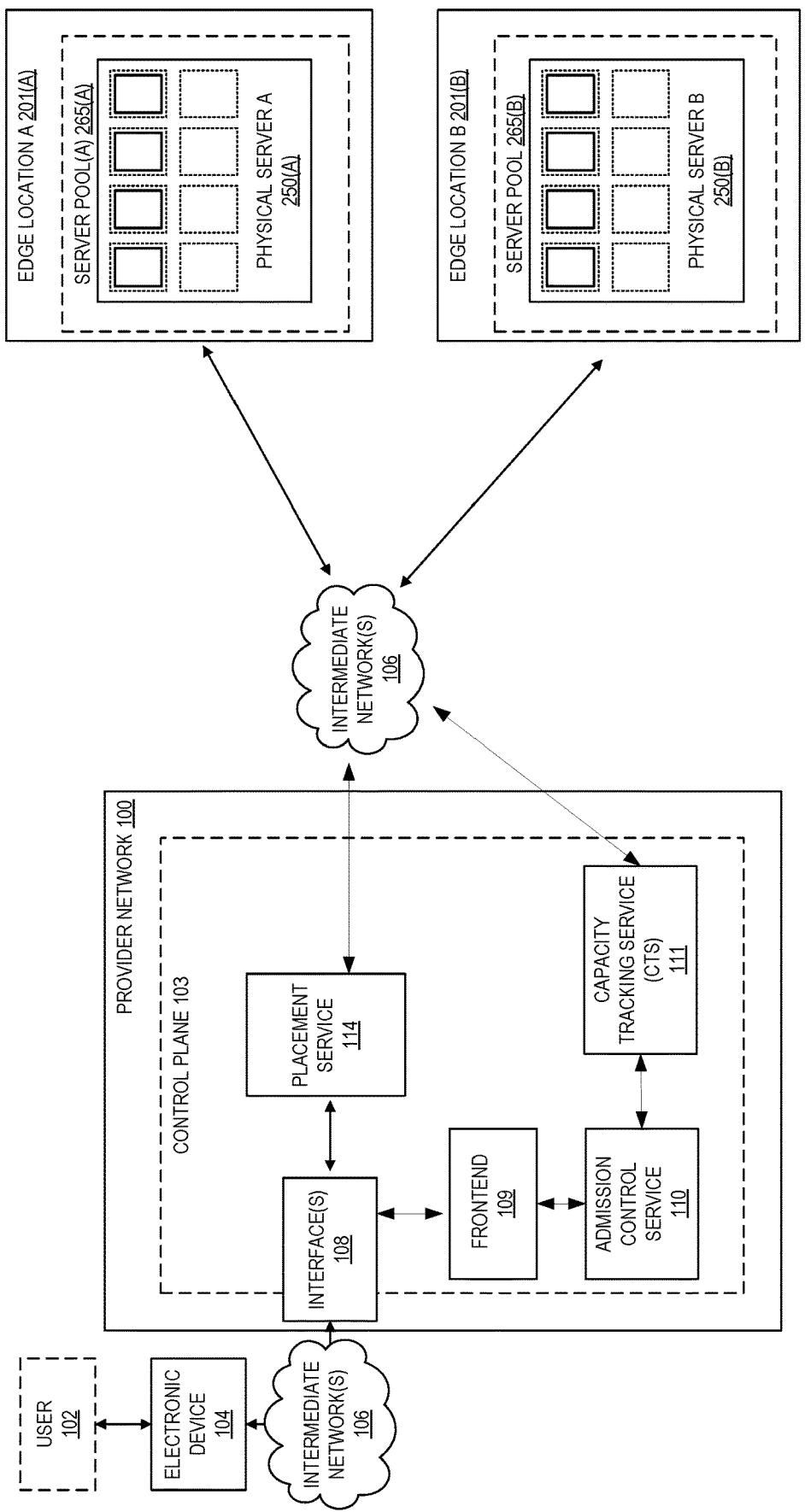
FIG. 2 illustrates an example of an environment including a fleet of hosts housed at one or more remote customer network(s).

FIG. 2 illustrates an example of an environment including a fleet of hosts housed at one or more remote customer network(s). As shown, edge locations 201(A)-(B) include one or more physical servers (for example, including physical servers 250-254 of server pools 265(A)-265(B)) is located at one or more data centers that is separate from the provider network 100. In some embodiments, an edge location offers services, infrastructure, and operating models to virtually any data center or other on-premises facility. In some examples, users can use the same APIs, tools, hardware, and the same functionality across edge locations and resources in a provider network 100 as a hybrid experience. For example, users might desire to use on-premises hardware to support workloads benefiting from low latency or local data processing needs, among other reasons. In some embodiments, the physical servers of the fleet may be purchased or otherwise obtained from the service provider and installed in a customer-managed network, or the physical servers may be obtained from other sources and configured to interface with the provider network 100.

In some embodiments, a provider network 100 enables users to manage the use of virtualized computing resources by multiple users at the fleets of physical servers located within the edge devices 201(A)-(B) in much the same way as if the servers were housed at a data center managed by the service provider. For example, users can use interface(s) 108 to launch virtualized computing resources onto physical servers, to configure custom placement preferences, manage executing resources, among other operations. In this example, a user of the provider network 100 can have even more control over the physical hardware and infrastructure upon which virtualized computing resources execute, while making use of the control plane and other functionality provided by the provider network 100. Thus, similar to the example described in FIG. 1, a request is submitted to an admission control service 110 to accept or denial a request for resources in the edge locations 201(A)-(B).

Figure 3:
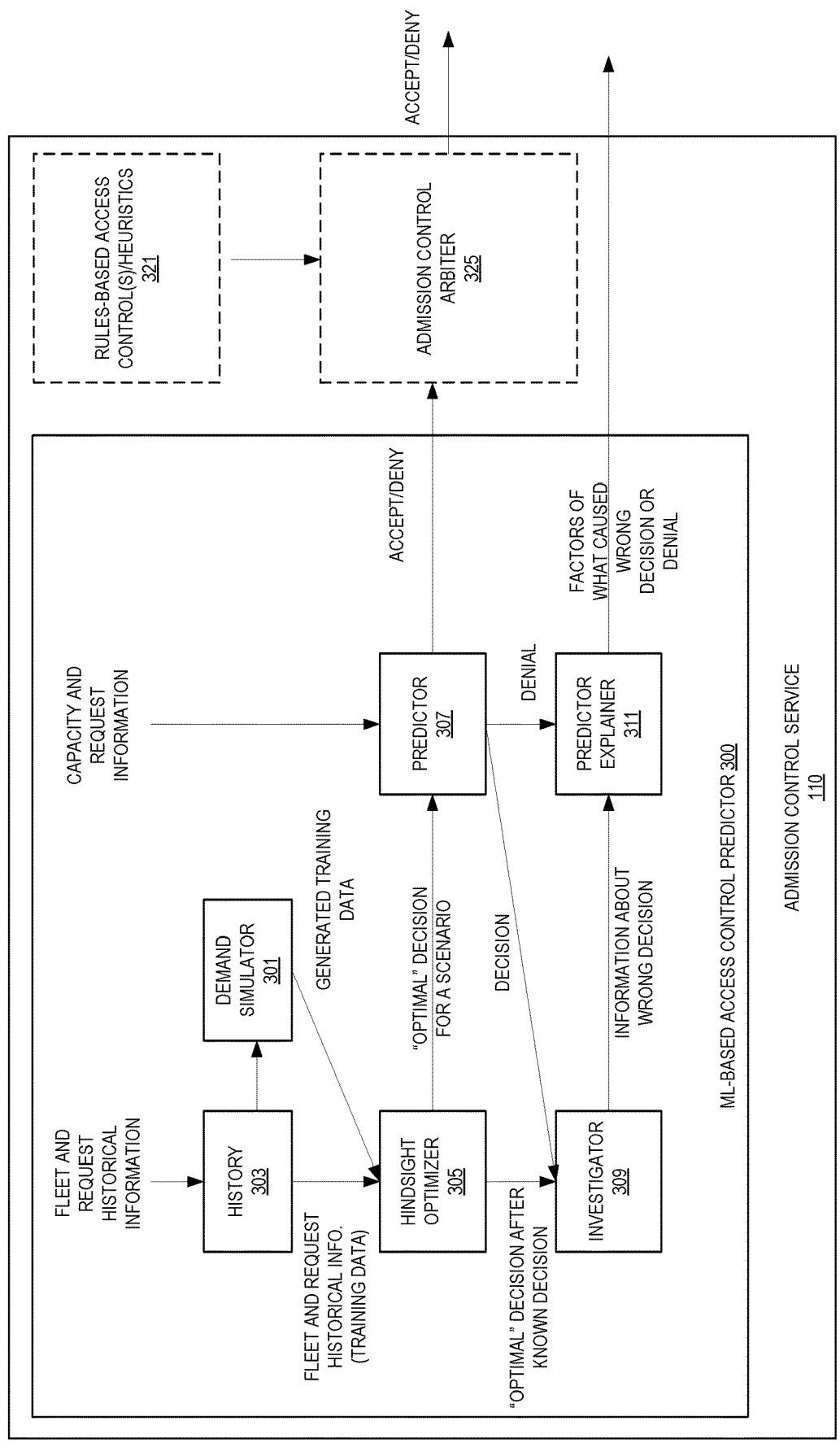
FIG. 3 illustrates embodiments of the admission control service.

FIG. 3 illustrates embodiments of the admission control service 110. As detailed above, the admission control service 110 may be used to manage resource usage. This illustration shows various aspects of the admission control service 110 that may include one or more rules-based access control(s) or heuristics based access controls 321 (such as role-based access control (RBAC), attribute-based access control (ABAC), access control lists (ACLs), and/or identity and access management (IAM)-style policies) and a machine-learning (ML)-based predictor 300. The rules-based systems utilized reasoned heuristics that have been put in place to reduce overall instances of ICEing using different sources of data. Unfortunately, what are "effective" rules change as does what parameters are more important. As such, rules-based systems tend to be changed using expensive simulations for tuning.

What is more detailed in this illustration is a ML-based access control predictor 300 that is more flexible than a rule-based system. The ML-based access control predictor 300 uses a ML-based predictor 307 to predict when an incoming request should be accepted or denied to protect one or more resources from being unable to serve as many customers/requests as possible with their computing resource needs, potentially subject to fairness or interpretability constraints. The training of the ML-based predictor 307 is based, at least in part, on hindsight (an "optimal" decision) of what should have happened. For example, did a rules-based access control system 321 deny or accept the request, did a downstream component deny or accept the request, etc.

To perform this hindsight analysis, a hindsight optimizer 305 uses historical and/or simulated data. A demand simulator 301 generates data representing a replay historical of requests and resource availability (such as slot availability, etc.). However, this may not completely characterize growing demands, or any demand pattern not captured by historical feed of requests. In some embodiments, this generation is performed using summary statistics of each account's calls and simulate call patterns based on the summary statistics so that we have more examples of call patterns that admission control can be expected to handle in the future. In some embodiments, the hindsight optimizer is an integer linear program.

History storage 303 stores replay capacity information and user usage history. For example, the history storage 303 stores one or more of information from downstream components about subsequent treatment of predictions, historical decisions of other admission control systems, etc.

The hindsight optimizer 305 looks at the free capacity and incoming requests to reconstruct what should be the accept or denial decision. In some embodiments, a linear program is used to make this reconstruction. This is considered to be hindsight as the optimizer 305 uses information from subsequent treatment of requests when it reconstructs an accept or denial decision to ICE a particular request.

When the hindsight optimizer 305 is run repeatedly on replayed historical or simulated data it captures the call patterns that it (and the predictor 307) may see in the future and generates a binary output of accept or deny. The notion of hindsight remaining opportunity is conceptually similar to the notion of regret in reinforcement learning, which looks at a difference between a reward from a policy optimal in hindsight and the policy currently being evaluated.

The ML-based predictor 307 provides, during inference time, a recommendation or decision of which requests to deny and which requests to allow. For example, when the output is a recommendation, that recommendation is provided to a decision-making entity such as a placement service, etc. as one point for the decision-making entity to utilize in making its allow/deny decision. When the output prediction is a denial, then in some embodiments the request goes no further. In other embodiments, the request is sent along with a denial to an admission control arbiter 325 (along with input from one or more rules-based access control(s) 321) to determine if the request should be approved or denied. In some embodiments, the request and the prediction (and/or output of the admission control arbiter 325) are sent downstream such that the downstream service (such as a placement service) knows to throw away the request, but also knows that the request exists. Note that when the ML-based predictor 307 is one component making an allowance/denial decision, in some embodiments, the request is denied if any of the components deny the request.

The ML-based predictor 307 uses a ML model that is a trained binary classifier that, as noted above, has been trained on request input features, pool health features (capacity information), and the binary result (yes or no) from the hindsight optimizer 305. During inference, the prediction 307 makes a prediction of whether the request should be accepted or denied based on the request input features and pool health features. This prediction is provided to a consumer (e.g., the requesting user, a downstream component, etc.). In some embodiments, the input features include, but are not limited to one or more of: an account (user) identifier, a slot type, a number of slots requested, a timestamp of the request, a compute region, usage information for the account, pool contention risk, an account saturation ratio, an indicator of abnormal usage, an aggregate slot request distribution over a period of time and a projected slot request distribution in the near term, an aggregate slot usage distribution over a period of time and a projected slot usage distribution in the near term, capacity in server pools that can "donate" to the requested pool via a rebuild or resize.

Many different types of ML models may be used as the ML of the ML-based predictor 307. In some embodiments, a Recurrent Neural Network (RNN) is utilized. In some embodiments, reinforcement learning based algorithms are used for training such as using a contextual bandit scheme. In some embodiments, ensemble-based ML models are utilized as random forests and gradient boosted trees. In some embodiments, a logistic regression classifier is utilized as the binary classifier. In other embodiments, a logistic regression classifier is utilized to determine which of the above input features are useful in making a prediction on whether or not to allow a request and therefore which of the above input features are to serve as an input to the ML-based predictor 307. It will be appreciated that such models include learned parameters, paths for flow of information through the model, and specified transformations that are performed on data at specific points within the model, that are stored in physical computer memory and implemented during inference using one or more physical computer processors.

Typically, for predictions of a denial (or when an approved request was denied downstream), an investigator 309 is launched after passage of time (e.g., a few hours). This excludes investigating requests that were approved and also honored downstream as that outcome would be normal when the pool is healthy. Essentially, this is an audit of the predictor 307 by comparing an optimal result based on hindsight with a predicted result. The investigator 309 logs the difference (for example, as fraction of what matched or did not match).

This audit may be performed in several ways. In some embodiments, a comparison to an actual result (e.g., a downstream rejection for an approved request, a downstream acceptance for a denied request, etc.) is made without having any other information. That is, there was a difference between the prediction and an end result. For this, the investigator 309 simply determines that there was an issue and logs the issue. This log could be as a percentage wrong (or correct), a raw number, etc. In some embodiments, the investigator 309 calls the hindsight optimizer 305 (has it should now be able to utilize the history 303 to make the "perfect" decision) to make a decision in hindsight based on the same input as the decision of the predictor 307 that was not correct. Note that not every outcome will be perfect from the predictor and there can be a residual rate of wrong decisions during normal operation. However, at least severe anomalies or changepoints in the amount of wrong decisions versus the right ones are alarmed.

In some embodiments, the binary output of the ML-based predictor 307 and the result of any investigation by the investigator 309 is input into a predictor explainer 311 which shows (e.g., graphically) how one or more of the input features (e.g., request content, availability, etc.) contributed to an incorrect deny/allow decision. In other words, the predictor explainer 311 shows feature-by-feature importance on the decision. The explanation may help develop trust in the decision. In some embodiments, a Local Interpretable Model-agnostic Explanations (LIME)-based predictor explainer 311 is used. In some embodiments, a Shapely Additive exPlanations (SHAP)-based predictor explainer 311 is used. Note that these two explainer types are exemplary.

Figure 4:
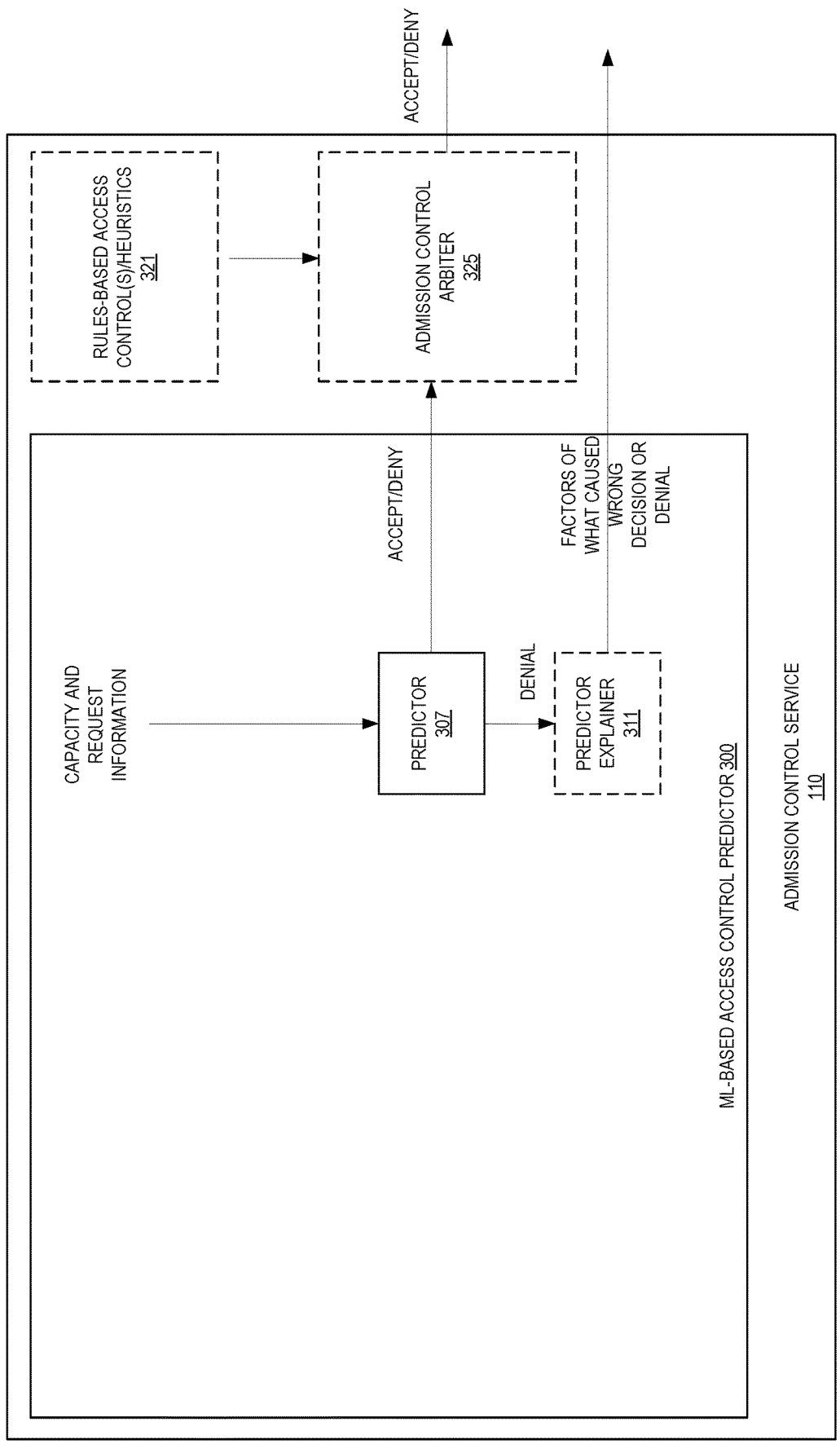
FIG. 4 illustrates embodiments of the admission control service that are utilized during inference of a request.

FIG. 4 illustrates embodiments of the admission control service 110 that are utilized during inference of a request. Note that the history 303, demand simulator 301, hindsight optimizer 309, and investigator 309 are not necessarily utilized. In some embodiments, the predictor explainer 311 is not used either.

As illustrated, during inference (runtime), the ML-based predictor 307 uses a ML model to predict from capacity and request information whether the request should be allowed or denied. This prediction is provided to a consumer (e.g., the requesting user, a downstream component, etc.). In some embodiments, the request information and capacity information include, but are not limited to one or more of: an account (user) identifier, a slot type, a number of slots requested, a timestamp of the request, a compute region, usage information for the account, pool contention risk, an account saturation ratio, an indicator of abnormal usage, an aggregate slot request distribution over a period of time and a projected slot request distribution in the near term, an aggregate slot usage distribution over a period of time and a projected slot usage distribution in the near term, capacity in server pools that can "donate" to the requested pool via a rebuild or resize.

The ML-based predictor 307 provides, during inference time, a recommendation or decision of which requests to deny and which requests to allow. For example, when the output is a recommendation, that recommendation is provided to a decision-making entity such as a placement service, etc. as one point for the decision-making entity to utilize in making its allow/deny decision. When the output prediction is a denial, then in some embodiments the request goes no further. In other embodiments, the request is sent along with a denial to an admission control arbiter 325 (along with input from one or more rules-based access control(s) 321) to determine if the request should be approved or denied. In some embodiments, the request and the prediction (and/or output of the admission control arbiter 325) are sent downstream such that the downstream service (such as a placement service) knows to throw away the request, but also knows that the request exists. Note that when the ML-based predictor 307 is one component making an allowance/denial decision, in some embodiments, the request is denied if any of the components deny the request.

In some embodiments, the predictor explainer 311 is engaged for denials to explain why the request was denied.

Figure 5:
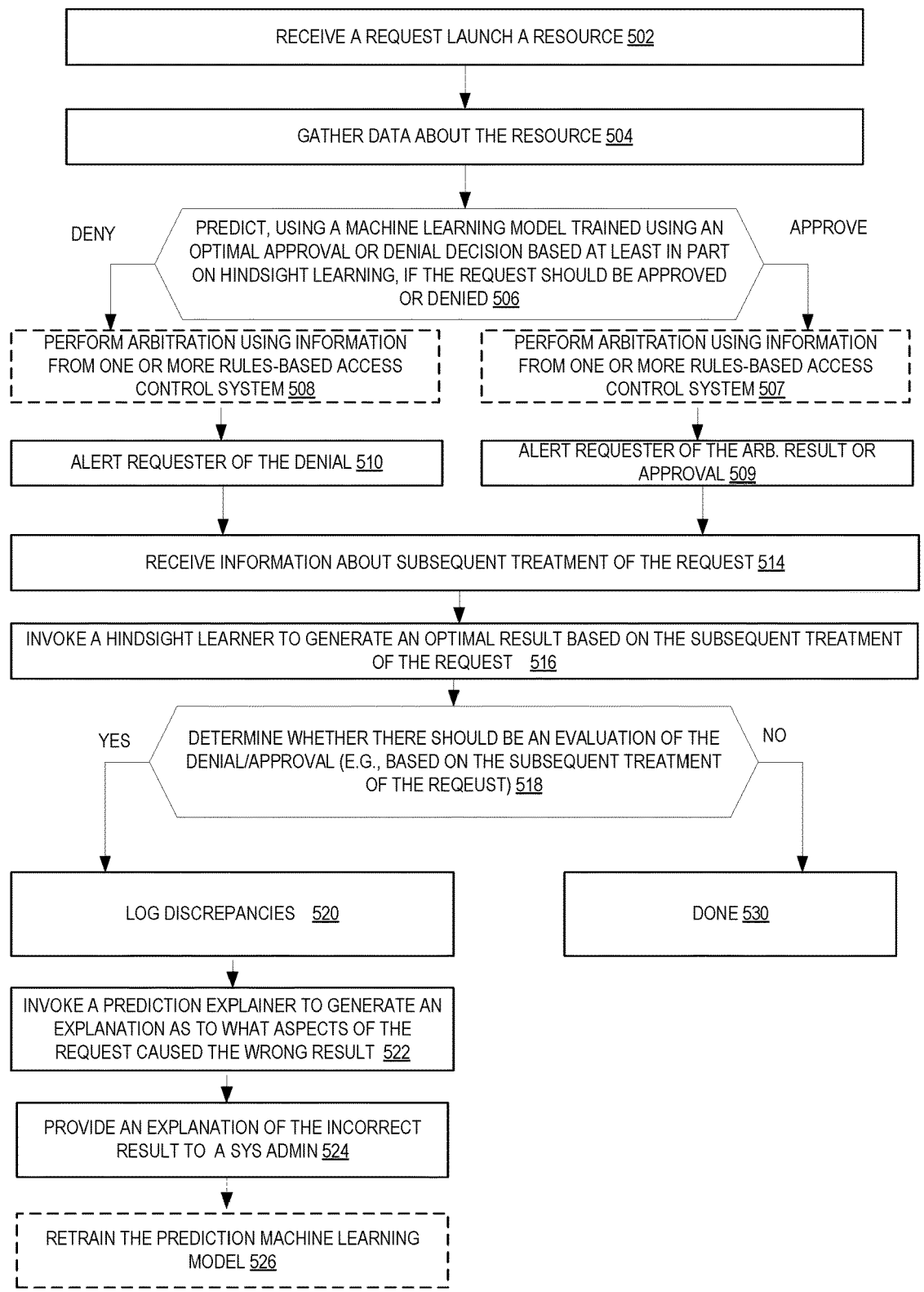
FIG. 5 is a flow diagram illustrating operations of a method for using machine learning to predict in the prediction of whether or not to allow a request according to some embodiments.

FIG. 5 is a flow diagram illustrating operations of a method for using machine learning to predict in the prediction of whether or not to allow a request according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the admission control service 110 of the other figures.

At 502, a request for launching a resource is received. Examples of content of the request have been detailed above.

Data about capacity for the requested resource is gathered at 504. For example, capacity information is requested and received from the CTS 111.

At 506, a prediction is made to either approve or deny the request based on the request itself and capacity information for the requested resource, using at least one machine learning model that has trained using an optimal approval or denial decision based at least in part on hindsight learning. As such, the at least one machine learning model takes in information from the request itself and the capacity information and generates a binary approve or deny decision.

When the prediction is to approve the request, in some embodiments, an arbitration is performed using the approval prediction and a decision from one or more rules-based access control systems at 507. That is the prediction may not be wholly dispositive. However, in some embodiments, if any one approve/deny decision maker indicates a denial then the request is denied.

The requester is alerted about the denial at 510. In some embodiments, this includes an invocation of a predictor explainer to detail why the request was denied during arbitration.

When the prediction is to deny the request, in some embodiments, an arbitration is performed using the denial prediction and a decision from one or more rules-based access control systems at 508. That is the prediction may not be wholly dispositive. However, in some embodiments, if any one approve/deny decision maker indicates a denial then the request is denied.

The requester is alerted about the outcome of the arbitration (denial or approval) or the approval when there is no arbitration at 509. In some embodiments, this includes an invocation of a predictor explainer to detail why the request was denied.

At some point later in time (e.g., a few hours later, the next day, etc.), information about the subsequent treatment of the request as received at 514. For example, a placement service may override the decision and therefore there may be a negative treatment of approved request that should be examined (and used to retrain the ML-based prediction model(s)).

At some point later in time, a hindsight learner is invoked to generate an optimal result based on the subsequent treatment of the request at 516. That is because the "history" of the request's treatment is now known, an optimal result can be determined.

A determination of whether there should be an evaluation of the denial/or approval is made at 518. In most embodiments, this determination is based on the subsequent treatment of the request. For example, the optimal result is then compared to the predicted result. When the output of the admission control service 110 matches the downstream treatment, then there may be nothing to learn and the flow stops at 530. Note in some embodiments, all denials from the admission control service 110 are evaluated.

When there are discrepancies, those discrepancies are logged at 520. These logs are available to a system administrator, etc. for later review.

At 522, a predictor explainer is invoked to generate an explanation as to what aspects of the request caused the wrong result. Details of such an explanation have been discussed earlier.

At 524, an explanation of the denial (or wrong approval) is provided to at least a system administrator. For a requester, this allows for the requester to change its approach to the request (e.g., allows the requester to change service levels, etc.). For the system administrator, this explanation may be used to help kick off a review of the admission control service 110.

In some embodiments, the at least one prediction ML-based model is retrained at 526. As the output of the hindsight learner should now be the current "optimal" result, the at least one prediction ML-based model can be trained for the scenario that caused the "wrong" result to have the "optimal" result.

Figure 6:
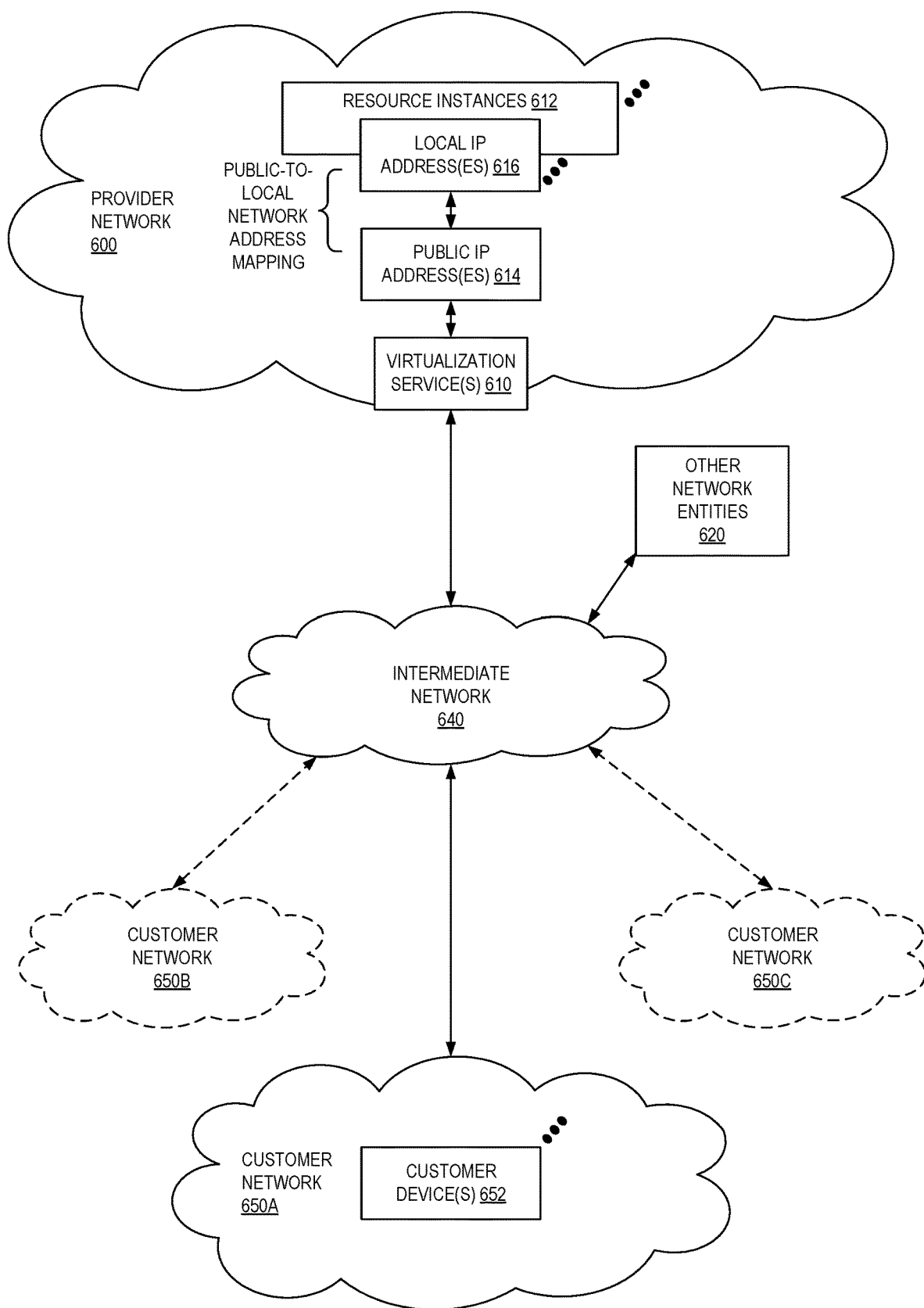
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
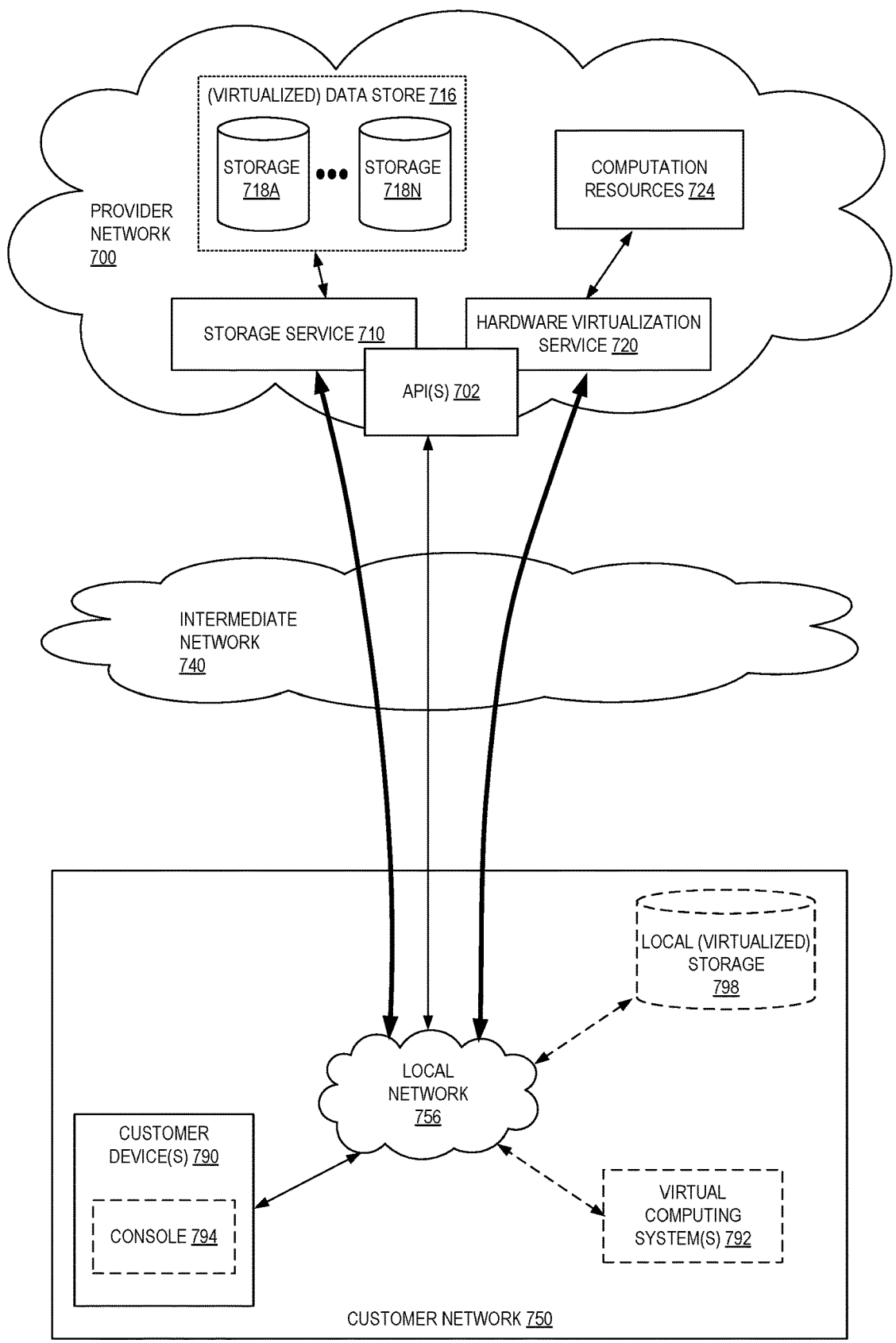
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
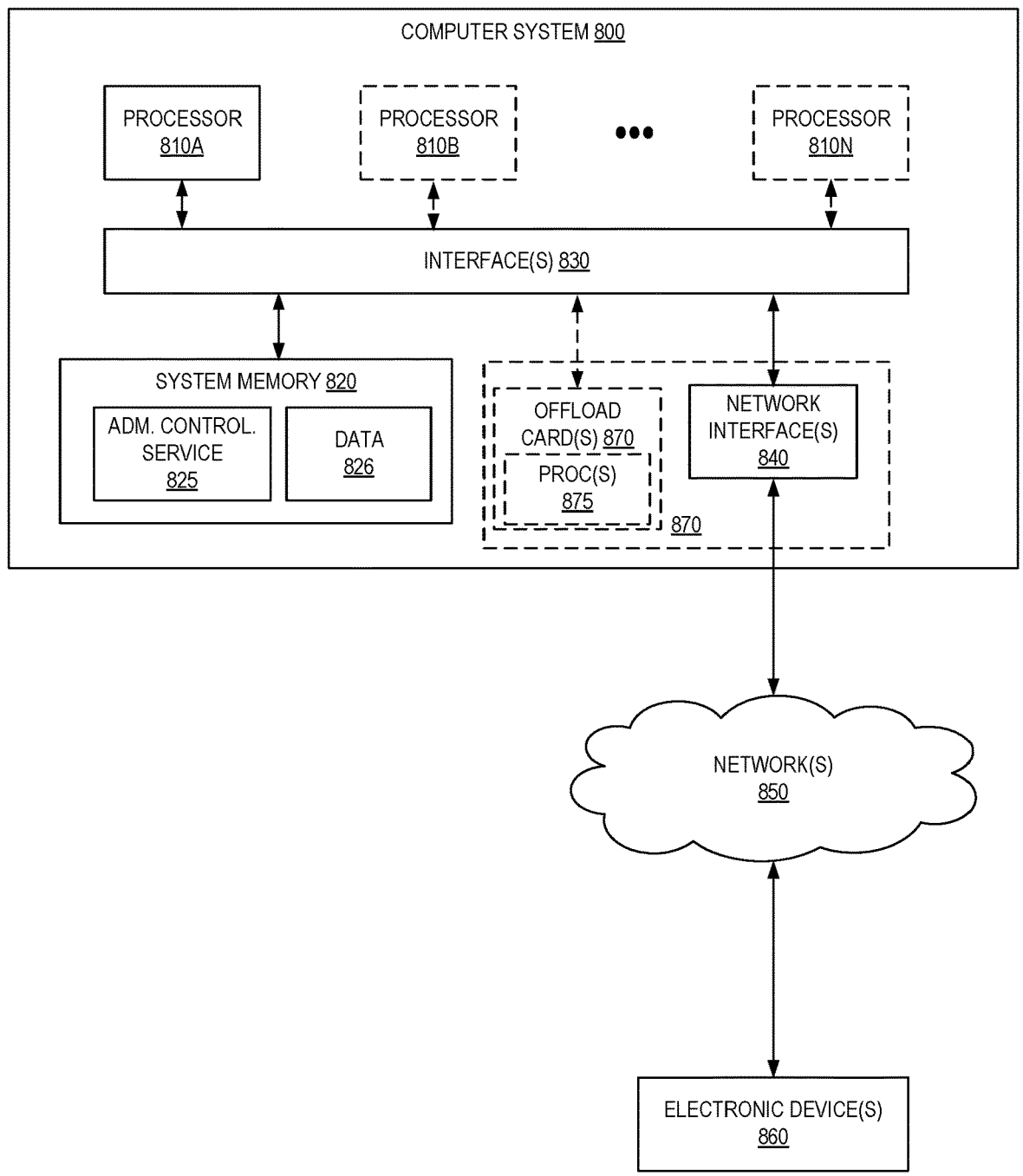
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as admission control service code 825 (e.g., executable to implement, in whole or in part, the admission control service 110) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a cloud provider network, a request to launch a computing resource, wherein the request includes one or more launch parameters indicating one or more configurations for the computing resource, and wherein the request further includes information about an account for the request, a slot type defining a type of resource to utilize, a number of slots of the slot type requested, and a timestamp for the request;
   obtaining capacity data indicating an amount of capacity available at the cloud provider network to satisfy the request;
   generating, using a machine learning model that has been trained based at least in part on an output of an automated historical hindsight learner that is an integer linear program, an approval prediction, wherein the approval prediction indicates that the request is to be approved based on one or more launch parameters of the request and the capacity data;

receiving information from a downstream component that controls the resource that the approval prediction is incorrect; and evaluating the incorrect approval prediction by:
  invoking the historical hindsight learner to generate an optimal result based at least in part on the information from the downstream component,
  comparing the optimal result to the approval prediction,
  logging any discrepancy based on the comparing,
  invoking a predictor explainer to generate an explanation as to what aspects of the request caused the incorrect prediction, and
  retraining the machine learning model based, at least in part, on the generated optimal result.

2. The computer-implemented method of claim 1, wherein the request is to launch an instance in a provider network.

3. A computer-implemented method comprising:
  receiving a request for a resource, wherein the request includes information about an account for the request, a slot type defining a type of resource to utilize, a number of slots of the slot type requested, and a timestamp for the request;
  gathering data about capacity for the requested resource;
  predicting, based at least in part on content of the request and the gathered capacity data, that the request is to be approved or denied using a machine learning model that has been trained based at least in part on an output of an automated historical hindsight learner that is an integer linear program;
  performing one of denying the request and approving the request based at least in part on the prediction;
  invoking the historical hindsight learner to generate an optimal result based at least in part on the information from a downstream component;
  comparing the optimal result to the prediction;
  logging any discrepancy based on the comparing; and
  invoking a predictor explainer to generate an explanation as to what aspects of the request caused an incorrect prediction.

4. The computer-implemented method of claim 3, wherein the request is to launch an instance in a provider network.

5. The computer-implemented method of claim 3, wherein the machine learning model is to additionally consider one or more of: aggregate slot usage, capacity from other resources that can donate to the requested resource, and usage of the account for the requester.

6. The computer-implemented method of claim 3, wherein the historical hindsight learner has been trained on historical data for a particular request.

7. The computer-implemented method of claim 3, wherein the historical hindsight learner has been trained on synthetic data approximating a particular request.

8. The computer-implemented method of claim 3, wherein the predictor explainer shows feature-by-feature importance of input into the machine learning model that has been trained based at least in part on an output of an automated historical hindsight learner that is an integer linear program.

9. The computer-implemented method of claim 3, wherein the machine learning model is a logistic regression classifier.

10. The computer-implemented method of claim 3, wherein the machine learning model is one of a recurrent neural network, a reinforcement learning based model, and an ensemble network.

11. The computer-implemented method of claim 3, wherein the predicting is performed as a part of an admission control service that includes at least one rules-based admission control service or heuristics-based service.

12. The computer-implemented method of claim 3, wherein the gathered capacity data is received from a capacity tracking service of a provider network.

13. A system comprising:
  a fleet of physical servers that host virtual machines (VMs); and
  a control plane service of a provider network implemented by one or more electronic devices, the control plane service including instructions that upon execution cause the control plane service to:
    receive a request to launch an instance on the fleet of physical servers, wherein the request includes information about an account for the request, a slot type defining a type of resource to utilize, a number of slots of the slot type requested, and a timestamp for the request;
    gather data about capacity for launching the requested instance;
    predict, based at least in part on content of the request and the gathered capacity data, that the request is to be approved or denied using a machine learning model that has been trained based at least in part on an output of an automated historical hindsight learner that is an integer linear program;
    perform one of denying the request and approving the request based at least in part on the prediction;
    invoke the historical hindsight learner to generate an optimal result based at least in part on the information from a downstream component;
    compare the optimal result to the prediction;
    log any discrepancy based on the comparison; and
    invoke a predictor explainer to generate an explanation as to what aspects of the request caused an incorrect prediction.

14. The system of claim 13, wherein the machine learning model is to additionally consider one or more of: aggregate slot usage, capacity from other resources that can donate to the requested resource, and usage of the account for the requester.

15. The system of claim 13, wherein the machine learning model is a logistic regression classifier.

16. The system of claim 13, wherein the machine learning model is one of a recurrent neural network, a reinforcement learning based model, and an ensemble network.

* * * * *